Patented July 22, 1924.

1,501,916

UNITED STATES PATENT OFFICE.

YASUJURO NIKAIDO, OF BAY CITY, MICHIGAN, ASSIGNOR TO MICHIGAN CHEMICAL COMPANY, A CORPORATION OF MICHIGAN.

FERTILIZER AND PROCESS OF MAKING THE SAME.

No Drawing. Application filed October 9, 1922. Serial No. 593,444.

*To all whom it may concern:*

Be it known that I, YASUJURO NIKAIDO, a citizen of Japan, and a resident of Bay City, in the county of Bay and State of Michigan, U. S. A., have made a new and useful Invention in Fertilizers and Processes of Making the Same, of which the following is a specification.

The invention relates to fertilizers and has for its primary object the provision of an improved form of fertilizer and a new method of preparing the same so that the fertilizer is produced in solid or powder form which does not collect moisture from the atmosphere and become sticky and difficult to handle under such conditions, and which may be made cheaply from products which have been regarded heretofore more or less as waste products resulting from the manufacture of beet sugar.

In the manufacture of beet sugar, there is a large quantity of evaporated Steffens waste water and in the beet molasses distillery, a large quantity of spent liquor or slop, such waste water and slop being generally referred to as "beet sugar residue." This residue contains fertilizer elements of value, such as potassium oxid and nitrogen and has heretofore been sold to a certain extent to fertilizer manufacturers to mix with other materials, such as phosphate rock (calcium phosphate) to make a complete fertilizer, but the residue has never been utilized by itself, or in a primary way, as a fertilizer, as it is of a viscous character and those using the fertilizers ordinarily have no facilities for applying thick liquid fertilizers. Liquid fertilizers also involve certain difficulties and expense in the matter of transportation due to the requirement of more or less expensive containers which does not apply to fertilizers in solid or powder form.

I have found that by proper treatment the beet sugar residue may be reduced to a powder form which remains permanently dry, and although absorbing some moisture from the atmosphere never becomes sticky and difficult to handle. The materials as thus produced contains a relatively high percentage of potassium oxid and nitrogen which are both plant foods of great value and this material may be applied to the soil or may be mixed with acid phosphate or phosphate rock, thus giving a fertilizer which contains phosphoric acid in addition to the nitrogen and potassium oxid. This mixture can be so adjusted as to give various proportions of nitrogen, phosphoric acid and potassium oxid depending upon the varying requirements of the soil. The powder which constitutes the subject matter of the present invention may, therefore, be prepared and sold without mixing with the acid phosphate or it may be mixed with the acid phosphate and sold as a complete fertilizer, and in either case the material remains permanently dry and readily transported and handled.

The procedure in preparing the powder from the beet sugar residue is as follows:

A desired quantity of beet residue is concentrated in an evaporator till it is free from water, transferred to the kettle which is previously heated to about 200° C., then sulphuric acid varying from 15 to 20 per cent on the weight of residue is added while the mass is being constantly agitated. After addition of acid, the temperature of the kettle is gradually raised to about 265° C. and kept at this point until the chemical action in the mass is completed. Then heating is discontinued and the mass is removed from the kettle and cooled. When cold, the mass becomes porous and brittle. The mass may readily be brushed and ground to a powder. As heretofore stated, the powder thus obtained remains permanently dry. It absorbs moisture from the atmosphere slightly, but never becomes sticky.

The yield of dry material is about 60 per cent of the original residue and the percentage of potassium oxid and nitrogen in the material made from the Steffens waste water is somewhat greater than is the case when the material is made from the beet molasses distillery residue. For example, the percentage of potassium oxid in the material made from the Steffens waste water was in one case 16.77 per cent of the mass and the percentage of nitrogen 5.34 per cent, while the percentage of potassium oxid in the material made from the distillery residue was 13.77 per cent of the mass and the nitrogen 5.16 per cent. The percentages in this particular instance are stated specifically, but it will be understood that there is a considerable variation depending upon the particular residue employed and the precise method practiced in reducing the material to powder form.

The powder as thus produced may be mixed with varying percentages of acid phosphate depending upon the requirements of the soil and may be even utilized without the acid phosphate or mixed with other fertilizers. The common procedure, however, is to mix the powder with acid phosphate and the following tables are presented as showing the percentages of nitrogen, phosphoric acid and potassium oxid with various mixtures of the powder produced from the spent liquor secured from the beet molasses distillery and from Steffens waste water in combination with acid phosphates containing various percentages of phosphoric acid.

| Materials used. | | | Per cent plant foods. | | |
|---|---|---|---|---|---|
| Powder from spent liquor. | Acid phosphate 16 per cent P₂O₅. | Acid phosphate 44 per cent P₂O₅. | Nitrogen. | Phosphoric acid. | Potassium oxid. |
| Parts. | Parts. | Parts. | | | |
| 50 | 50 | ---- | 2.58 | 8.0 | 6.88 |
| 60 | 34 | 6 | 3.10 | 8.0 | 8.26 |
| 70 | 18.5 | 11.5 | 3.62 | 8.0 | 9.64 |
| 80 | 2.5 | 17.5 | 4.14 | 8.0 | 11.02 |
| 90 | ---- | 10 | 4.65 | 8.0 | 12.39 |

| Materials used. | | | Per cent plant foods. | | |
|---|---|---|---|---|---|
| Powder from Steffens waste water. | Acid phosphate 16 per cent P₂O₅. | Acid phosphate 44 per cent P₂O₅. | Nitrogen. | Phosphoric acid. | Potassium oxid. |
| Parts. | Parts. | Parts. | | | |
| 50 | 50 | ---- | 2.67 | 8.0 | 8.38 |
| 60 | 34 | 6 | 3.20 | 8.0 | 10.06 |
| 70 | 18.5 | 11.5 | 3.74 | 8.0 | 11.74 |
| 80 | 2.5 | 17.5 | 4.27 | 8.0 | 13.42 |
| 90 | ---- | 10 | 4.80 | 8.0 | 15.10 |

The process of producing the solid or powder from the beet sugar waste is capable of considerable variation depending upon variations in conditions and in the materials used. The temperature to which the material is heated in the kettle has been referred to as 265° C., but the range of temperature may be considerably varied and may run upward from 220° to 270° C. depending upon the material. The Steffens waste water, for instance, ordinarily does not require as high a temperature as does the evaporated slop. The amount of acid employed may also be varied. The use of the sulphuric acid is important as it is a powerful destructive agent of organic substances, and it is these organic substances which, in my opinion, impart the sticky quality to the product when it is heated without the acid. The application of the high temperature in connection with the sulphuric acid intensifies the action of the acid in destroying the organic substances and thus giving a product which is a permanently dry solid either when stored alone or mixed with acid phosphate or phosphate rock. A further advantage secured in treating the residue with the sulphuric acid is to arrest the nitrogen which is evolved from nitrogenous organic substances when subjected to high temperature. When heated to a high temperature, ranging upward of 200° C., the nitrogenous organic substances in the residue partially decompose giving off nitrogen in the form of ammonia or amine gases, which, combined with the sulphuric acid, form sulphate of ammonia and hydro-sulphate of amines, thereby preventing a loss of nitrogen. I have found in the practice of the invention that there is substantially no loss of nitrogen during the practice of the process.

What I claim is:

1. A fertilizer in the form of a permanently dry solid produced by treating beet sugar residue with acid and heating at a temperature upwards of 200° C.

2. A process of producing a fertilizer which consists in treating concentrated beet sugar residue with an acid and heating at a temperature of upwards of 200° C. until the mass when subsequently cooled forms a permanently dry solid.

3. A process of producing a fertilizer which consists in heating concentrated beet sugar residue with sulphuric acid and heating at a temperature of upwards of 200° C. until the mass when subsequently cooled forms a permanently dry solid.

4. A process of producing a fertilizer which consists in evaporating beet sugar residue, adding sulphuric acid, and heating at a temperature of upwards of 200° C. until the mass when subsequently cooled forms a permanently dry solid.

5. A process of producing a fertilizer which consists in evaporating beet sugar residue until it is substantially free from water, adding sulphuric acid and heating at a temperature of upwards of 200° C. until the mass when subsequently cooled forms a permanently dry solid.

6. A process of producing a fertilizer which consists in evaporating beet sugar residue until it is substantially free from water, adding sulphuric acid in quantity by weight ranging in the neighborhood of fifteen to twenty per cent of the weight of the residue and heating at a temperature of upwards of 200° C. until the mass when subsequently cooled forms a permanently dry solid.

7. A process of producing a fertilizer which consists in evaporating beet sugar residue until it is substantially free from water, transferring the mass to a receptacle heated to a temperature approximating 200° C., adding sulphuric acid, and continuing the heating at an increasing temperature until the subsequently cooled mass forms a permanently dry solid.

8. A process of producing a fertilizer which consists in evaporating beet sugar residue, adding sulphuric acid and heating at a temperature of upwards of 200° C. until the subsequently cooled mass forms a solid containing upwards of ten per cent of potash and upwards of three per cent of nitrogen.

In testimony whereof, I have hereunto subscribed my name this fourth day of October, 1922.

YASUJURO NIKAIDO.